US009196050B2

(12) United States Patent
Wei et al.

(10) Patent No.: US 9,196,050 B2
(45) Date of Patent: Nov. 24, 2015

(54) IMAGE-BASED BRIDGE IDENTIFICATION AND BOUNDARY DETECTION

(71) Applicant: Google Inc., Mountain View, CA (US)

(72) Inventors: Xiaolin Wei, Fremont, CA (US); Hui Lou, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/248,412

(22) Filed: Apr. 9, 2014

(65) Prior Publication Data

US 2015/0294477 A1 Oct. 15, 2015

(51) Int. Cl.
*G06K 9/48* (2006.01)
*G06T 7/00* (2006.01)

(52) U.S. Cl.
CPC ............... *G06T 7/0083* (2013.01); *G06K 9/48* (2013.01); *G06T 2207/30184* (2013.01)

(58) Field of Classification Search
CPC ... G06K 9/0063; G06K 9/00; G06K 9/00818; G06K 9/00798; G06T 7/0081; G06T 7/0085; G06T 7/0079; G06T 7/0004; G05D 2201/0213; G01J 3/0229; H04N 5/2226; H04N 9/76; A61B 19/5244; A61B 2019/505; A61B 6/469; H02K 2213/03; B63C 11/12; G03F 7/70691; Y10S 428/929; Y10S 428/935; Y10S 428/936; Y10S 428/937; A42B 3/105; A42B 3/185; A42B 3/20; G03B 17/52; H01L 12/2859
USPC ......... 382/103, 118, 162, 173, 190, 199, 239, 382/283
See application file for complete search history.

(56) References Cited

U.S. PATENT DOCUMENTS

| 4,746,793 | A | * | 5/1988 | Hopkins, II ................ 250/237 R |
| 5,424,742 | A | * | 6/1995 | Long et al. .................. 342/25 C |
| 6,252,985 | B1 | | 6/2001 | Mitsunaga et al. |
| 6,404,936 | B1 | | 6/2002 | Katayama et al. |
| 7,738,707 | B2 | | 6/2010 | Wiedemann et al. |
| 7,830,638 | B1 | * | 11/2010 | Jiang et al. ................. 360/234.5 |
| 7,894,675 | B2 | | 2/2011 | Wiedemann et al. |

(Continued)

OTHER PUBLICATIONS

Gedik et al., "A New Robust Method for Bridge Detection From High Resolution Electro-Optic Satellite Images" Proceedings of the 4th GEOBIA, Rio de Janeiro—Brazil, May 7-9, 2012, pp. 298-302.

(Continued)

*Primary Examiner* — Barry Drennan
*Assistant Examiner* — Aklilu Woldemariam
(74) *Attorney, Agent, or Firm* — Dority & Manning, P.A.

(57) ABSTRACT

Systems and methods for image-based bridge identification and boundary detection are provided. One example method includes determining, by one or more computing devices, a wide bridge mask and a narrow bridge mask based at least in part on a road mask and a water mask. The method includes selecting, by the one or more computing devices, a portion of an image depicting a bridge based at least in part on the wide bridge mask and the narrow bridge mask. The method includes identifying, by the one or more computing devices, a plurality of line features included in the portion of the image depicting the bridge. The method includes determining, by the one or more computing devices, a bridge boundary in the portion of the image based at least in part on the plurality of line features. One example system includes a bridge image extraction module and a bridge boundary determination module.

20 Claims, 11 Drawing Sheets

(56) References Cited

U.S. PATENT DOCUMENTS

| | | | |
|---|---|---|---|
| 7,936,903 B2 * | 5/2011 | Ekin | 382/104 |
| 8,081,799 B2 | 12/2011 | Wiedemann et al. | |
| 8,379,972 B1 | 2/2013 | Wang et al. | |
| 8,385,609 B2 | 2/2013 | Piramuthu et al. | |
| 8,520,940 B1 * | 8/2013 | Schpok et al. | 382/164 |
| 8,593,542 B2 | 11/2013 | Steinberg et al. | |
| 8,625,897 B2 | 1/2014 | Criminisi et al. | |
| 8,913,783 B2 * | 12/2014 | Khan et al. | 382/103 |
| 2005/0013486 A1 * | 1/2005 | Wiedemann et al. | 382/181 |
| 2005/0100220 A1 * | 5/2005 | Keaton et al. | 382/191 |
| 2011/0044509 A1 * | 2/2011 | Huang et al. | 382/107 |

OTHER PUBLICATIONS

Jin et al., "Road Feature Extraction from High Resolution Aeriai Images Upon Rural Regions Based on Multi-Resolution Image Analysis and Gabor Filters", *InTechOpen*, Jun. 13, 2012, pp. 387-415.

Macek et al., "A lane detection vision module for driver assistance" *ISLab—Intelligent Systems Laboratory*, Web, Mar. 20, 2014, 6 pages /islab.ulsan.ac.kr/.

"Canny Edge Detector", *OpenCV*, Web, Apr. 7, 2014, 6 pages /http://docs.opencv.org/doc/tutorials/imgproc/imgtrans/canny_detector.html/.

"Hough Line Transform", *OpenCV*, Web. Apr. 7, 2014, 7 pages /http://docs.opencv.org/doc/tutorials/imgproc/imgtrans/hough_lines/hough_lines.html/.

Santos et al., "Learning to segment roads for traffic analysis in urban images" Intelligent Vehicles Symposium (IV), 2013 IEEE, Jun. 23-26, 2013, pp. 527-532.

* cited by examiner

IMAGE-BASED BRIDGE IDENTIFICATION AND BOUNDARY DETECTION

FIELD

The present disclosure relates generally to image-based bridge identification and boundary detection. More particularly, the present disclosure is directed to systems and methods for identifying images depicting bridges and then determining corresponding bridge boundaries for the identified bridges.

BACKGROUND

The accurate reconstruction of three-dimensional shapes from imagery is a quickly advancing field of computer vision. A basic concept of three-dimensional reconstruction algorithms is to find correspondences (e.g. matched pixels) among two-dimensional posed images. The correspondences can then be used to assist in reconstructing three-dimensional models of the shapes.

However, it is well known that the three-dimensional reconstruction of the surface of a body of water (e.g. a river, lake, or ocean) poses an extreme challenge to current reconstruction algorithms. In particular, because the surface of the water is textureless and constantly moving, established pixel correspondences are subject large errors. Therefore, reconstructed water surfaces generally exhibit a large degree of noise and appear spiky or otherwise poorly reconstructed.

One solution to address this problem is the use of a manually-generated water mask that identifies locations at which bodies of water reside. The locations covered by the water mask are not reconstructed, but instead smooth hole filling is performed. However, manual creation of a highly accurate water mask is a time consuming process and, therefore, water masks tend to be imprecise in nature. In particular, use of an imprecise water mask can cause bridges to be treated as water and therefore cause the bridges to fail to be reconstructed.

Another potential solution to the above noted challenges is to intersect the water mask with a road mask that identifies locations at which roads reside, thereby generating a bridge mask indicating the locations of bridges. However, the road mask may not contain road width information or may, similar to the water mask, contain various inaccuracies. Therefore, complete reliance upon such inaccurate road and water masks can cause various defects in the corresponding bridge mask and, ultimately, the resulting reconstructions.

However, bridges can be landmarks or otherwise convey the character of a city. For example, the Brooklyn Bridge remains an enduring icon of New York City. Therefore, failure to reconstruct bridges can greatly diminish the realism, consistency, and user experience of exploring a rendering of a three-dimensional model of a city.

Furthermore, similar to other structures, bridges can generally be reconstructed accurately using reconstruction algorithms. Therefore, given accurate and precise masking, imagery of bridges can be used to successfully reconstruct bridges and contribute to the realism and consistency of a three-dimensional model of a city or the entire Earth.

Thus, systems and methods for identifying images depicting bridges and then determining corresponding bridge boundaries for the identified bridges are desirable. In particular, knowledge of bridge boundaries within an image can be used to provide an improved bridge mask for use in association with three-dimensional reconstructions.

SUMMARY

Aspects and advantages of the present disclosure will be set forth in part in the following description, or may be obvious from the description, or may be learned through practice of embodiments of the present disclosure.

One example aspect of the present disclosure is directed to a method for determining bridge boundaries in images. The method includes determining, by one or more computing devices, a wide bridge mask and a narrow bridge mask based at least in part on a road mask and a water mask. Each of the one or more computing devices includes one or more processors. The method includes selecting, by the one or more computing devices, a portion of an image depicting a bridge based at least in part on the wide bridge mask and the narrow bridge mask. The method includes identifying, by the one or more computing devices, a plurality of line features included in the portion of the image depicting the bridge. The method includes determining, by the one or more computing devices, a bridge boundary in the portion of the image based at least in part on the plurality of line features.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
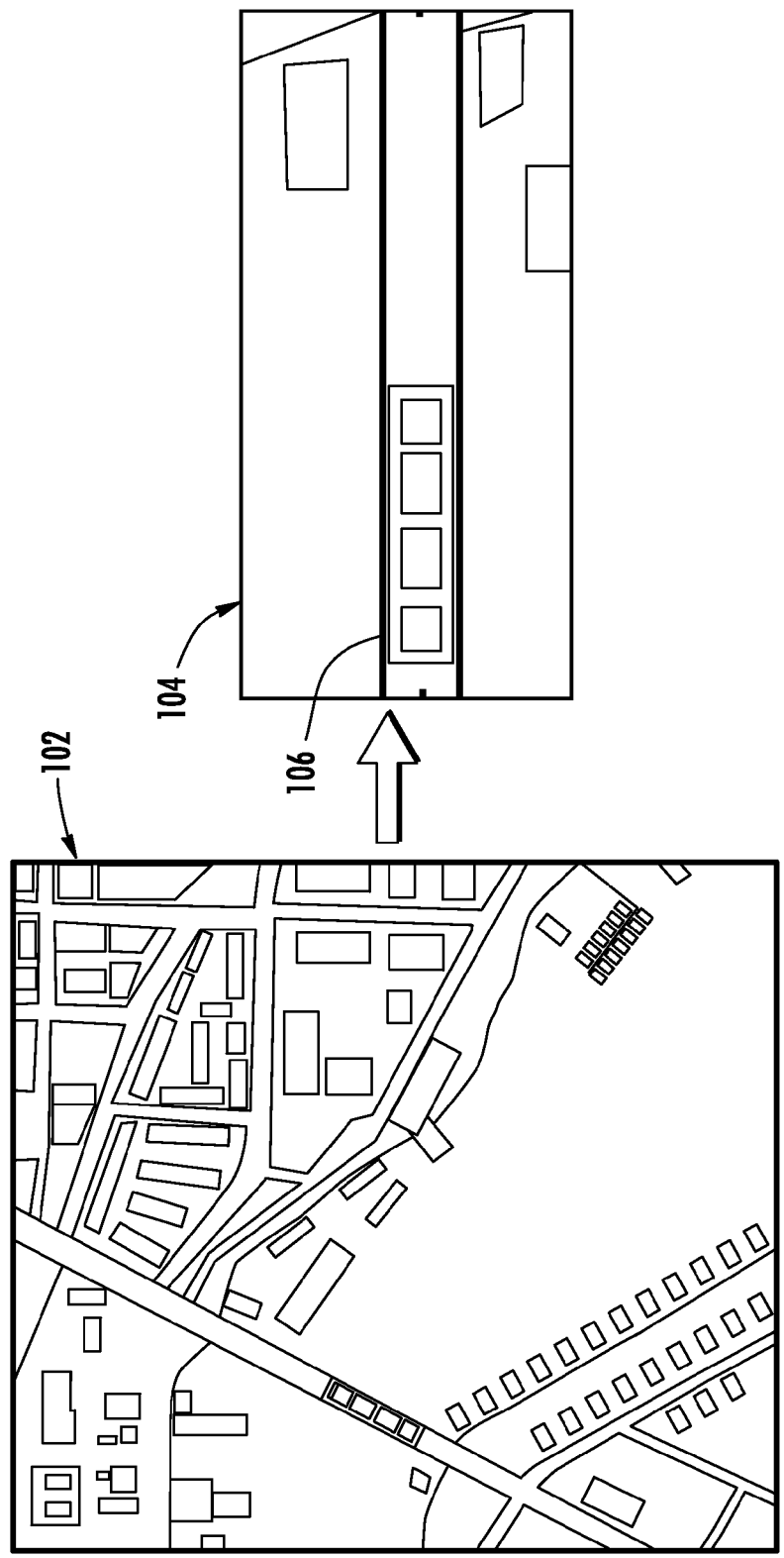
FIG. 1 depicts an example image and an example bridge boundary in a portion of the image according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Overview

Generally, the present disclosure is directed to systems and methods for identifying images depicting bridges and then determining corresponding bridge boundaries for the identified bridges. In particular, each of a plurality of images can be analyzed to determine whether such image depicts a bridge. As an example, a road mask can be rasterized using a first road width value to generate a wide road mask and using a second road width value to generate a narrow road mask. An intersection of the wide road mask and a water mask can be determined and used as a wide bridge mask. An intersection of the narrow road mask and an eroded version of the water mask can be determined and used as a narrow bridge mask. If an intersection of the wide bridge mask and the narrow bridge mask for an image is not null, then the image can be identified as depicting a bridge. Furthermore, a longest connected narrow bridge component within the image can be identified and used to assist in rotating and cropping the image to output a bridge image depicting isolated imagery of the bridge. One or more line detection algorithms can be performed for each bridge image to identify a plurality of line features. A bridge boundary can be determined based on the plurality of line features. For example, the bridge boundary can be determined by identifying an oriented bounding box the captures one or more dominant line features. The imagery contained within the bridge boundary can then be used to assist in generating a three-dimensional model of the bridge. In such fashion, an image can be analyzed to identify bridge boundaries for depicted bridges.

More particularly, a road mask and a water mask can respectively describe the locations of roads and bodies of water located in each of a plurality of images. For example, each image can be an orthographical satellite or aerial image. The road mask and the water mask can provide relatively rough estimates of road and water location.

In particular, in some embodiments, the road mask can be a vector of polylines that indicate the location of one or more roads in each image. In some instances, the road mask can describe the locations of respective road lanes rather than the road as a whole. The road mask can be rasterized using a first road width value (e.g. eight meters) to obtain a wide road mask. Likewise, the road mask can be rasterized using a second road width value (e.g. one meter) to obtain a narrow road mask.

In some embodiments, the water mask can indicate whether a body of water exists at each of a plurality of locations respectively corresponding to a plurality of pixels included in each image. For example, in some implementations, the water mask can be a pixel mask that provides a binary water value for each pixel of each image.

A wide bridge mask can be obtained by determining the intersection of the wide road mask and the water mask. Thus, the wide bridge mask can indicate locations at which both roads and bodies of water are believed to exist.

A narrow bridge mask can be obtained by determining the intersection of the narrow road mask and an eroded version of the water mask. For example, the eroded version of the water mask can be obtained by eroding the water mask by an erosion distance (e.g. ten meters). Thus, components of the narrow bridge mask can generally be shorter than corresponding components of the wide bridge mask (e.g. by about twenty meters).

In some embodiments, if the intersection of the wide bridge mask and the narrow bridge mask for a given image is not null, then the image can be identified as depicting at least a portion of a bridge. Further, if the image does not depict the entirety of the bridge, the image can be expanded or otherwise supplemented with imagery depicting adjacent locations until the entirety of the bridge is depicted within the expanded image.

Each image identified as depicting a bridge can be transformed (e.g. rotated) and cropped so as to isolate the portion of such image that depicts the bridge. As an example, the longest connected narrow bridge mask component within the image can be identified and the image can be rotated or otherwise transformed so that the longest connected narrow bridge mask component is horizontal in nature. The image can then be cropped so that the longest connected narrow bridge mask component is located in the center of the cropped portion of the image. The cropped portion of the image can have a width generally equivalent to the length of the longest connected narrow bridge mask component and can have a height that is two times a constant value (e.g. fifty meters). Each cropped portion of an image can be output as a bridge image.

One or more line detection algorithms can be performed for each bridge image to identify a plurality of line features. The employed line detection algorithms can be robust against bridge shadows, water reflection, waves on water, and/or other changes in color or lighting.

As an example, performing the line detection algorithms can include first performing an edge detection algorithm on the original image to generate an edge image. For example, the edge detection algorithm can be the Canny edge detector used with a dynamically computed threshold (e.g. a signal-to-noise ratio). Next, a line detection algorithm can be applied to the edge image to identify the plurality of line features. For example, the line detection algorithm can be a modified Hough Transform algorithm that considers both gradient orientation and gradient magnitude.

After the plurality of line features have been identified, one or more filtering techniques can be applied to identify one or more dominant line features. In particular, in addition to line features corresponding to the bridge boundary, road median, bridge truss, or other bridge related objects, the detected line features may include undesirable features corresponding to depicted objects other than bridge, such as, for example, boats, boat wake, water reflection, land, or other objects.

Thus, the one or more dominant line features corresponding to the bridge can be identified by eliminating such undesirable line features according to various criteria, such that the dominant line features remain.

As an example, because dotted line features are most likely to correspond to water waves or reflections, line features that have a high percentage of gap pixels can be eliminated. As another example, a dominant orientation exhibited by the plurality of line features can be identified. Any of the plurality of line features that exhibit an orientation inconsistent with the dominant orientation can be eliminated.

As yet another example, line features that are approximate to one another can be connected so that line features that are shorter in total length than a threshold length can be eliminated.

The bridge boundary can then be determined based on the remaining line features. As an example, in some embodiments, a minimized oriented bounding box (OBB) that encloses all remaining line features can be identified and used as the bridge boundary. In some implementations, the bounding box can be constrained to be oriented according to the dominant orientation of the line features or constrained to be oriented horizontal in nature.

After the bridge boundary is determined, the imagery included within the bridge boundary can be used to assist in generating a three-dimensional model of the bridge. As an example, the bounding box can be rasterized to form a final bridge mask for the image.

In some implementations, a three-dimensional reconstruction algorithm can be applied to the imagery included in the final bridge mask to generate a three-dimensional model of the bridge suitable, for example, for rendering in a geographic information system. Alternatively, the three-dimensional reconstruction algorithm can be applied to all available imagery and then the portions of the resulting three-dimensional model that correspond to locations included within the water mask but not the final bridge mask can be discarded.

In such fashion, the systems and methods of the present disclosure can identify images depicting bridges and then determine corresponding bridge boundaries for the identified bridges. In particular, roughly accurate road and water masks can be used to identify, isolate, and extract imagery depicting a bridge. A specially designed line detection technique can then be applied to the extracted image portions to assist in determining a bridge boundary.

With reference now to the FIGS., example embodiments of the present disclosure will be discussed in further detail.

Example Imagery

FIG. 1 depicts an example image 102 and an example bridge boundary 106 in a portion 104 of the image 102 according to an example embodiment of the present disclosure.

As shown in FIG. 1, image 102 can be an orthographical image of the surface of the Earth. For example, image 102 can be imagery collected by a satellite or from an airplane. As another example, image 102 can be a synthesized image generated by image rectification or texturing. Image 102 can depict a bridge over a body of water.

In some implementations of the present disclosure, image 102 can be one or more of a plurality of images in a collection of images. For example, the plurality of images can be satellite imagery that aggregately depict an area such as a city or the entirety of the surface of the Earth.

As an example, the plurality of images can be orthographical imagery that are organized into a plurality of image tiles. Each image tile (e.g. image 102) can depict a particular subsection of the depicted region. Thus, each image tile can have adjacent image tiles that depict adjacent locations.

However, the systems and methods of the present disclosure can be applied to any form of imagery, regardless of the existence of any organizing structure. Furthermore, image 102 can have any suitable color space or formatting, including, for example, RGB, RGBA, grayscale, CMYK, or other color spaces or formatting.

According to an aspect of the present disclosure, image 102 can be analyzed to determine whether image 102 depicts a bridge. As an example, a water mask and a road mask can respectively describe the locations of roads and bodies of water located in image 102. Using the water mask and road mask, it can be determined whether image 102 depicts a bridge.

If it is determined that image 102 depicts a bridge. Then the portion of image 102 that depicts the bridge can be isolated and extracted. In particular, application of the systems and methods of the present disclosure to image 102 has resulted in extraction of portion 104 of image 102. As can be seen from FIG. 1, portion 104 depicts a bridge. Portion 104 has been rotated and cropped so as to isolate the imagery depicting the bridge.

According to another aspect of the present disclosure, portion 104 of image 102 can be analyzed to determine a bridge boundary 106 of the bridge depicted in portion 104. In particular, the bridge boundary 106 can identify, relative to the imagery of portion 104, a boundary between the depicted bridge and the depicted body of water. The imagery included within the bridge boundary 106 can be used to reconstruct a three-dimensional model of the bridge depicted by image 102.

Thus, the systems and methods of the present disclosure provide improved techniques for precisely identifying imagery depicting bridges for use in three-dimensional reconstructions.

Example Methods

Figure 2:
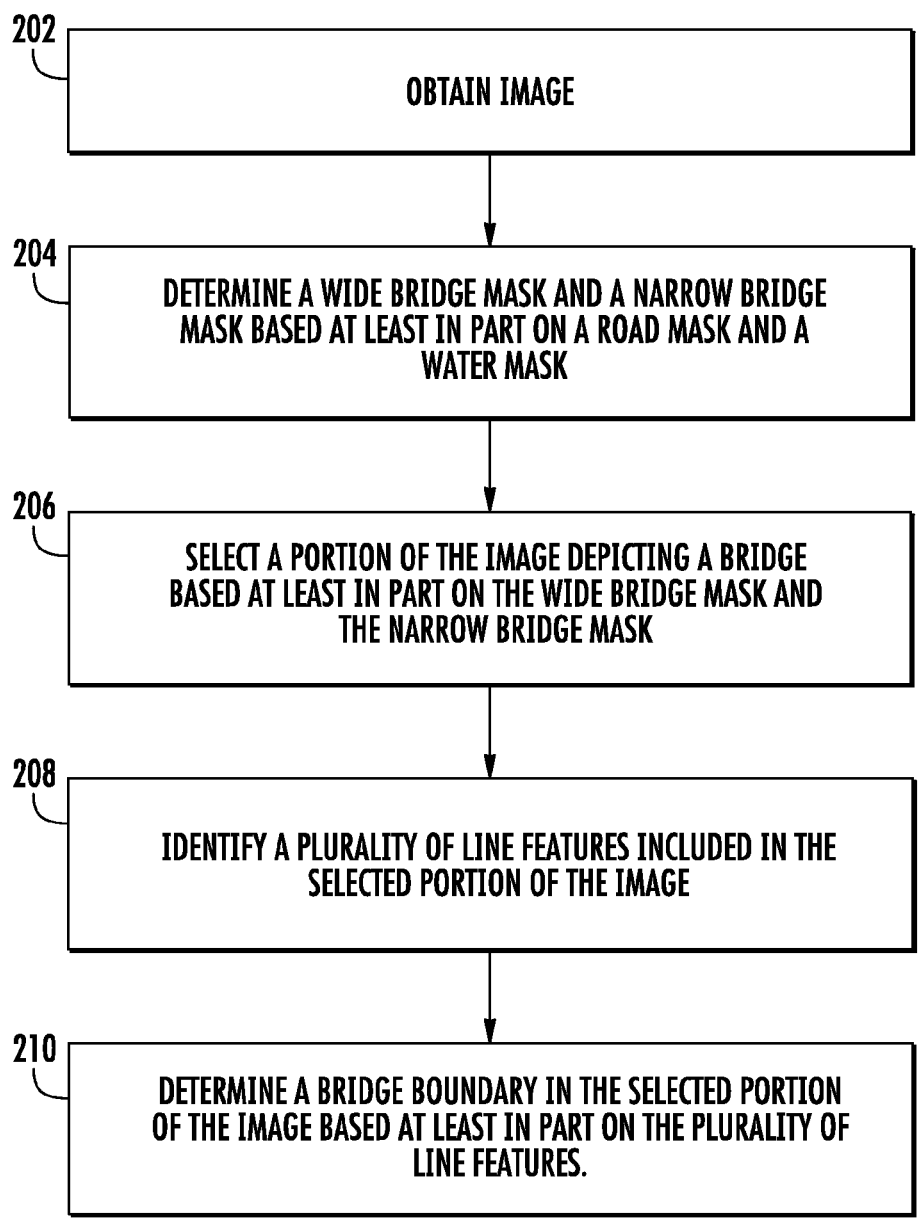
FIG. 2 depicts a flow chart of an example method for determining bridge boundaries in images according to an example embodiment of the present disclosure.

FIG. 2 depicts a flow chart of an example method (200) for determining bridge boundaries in images according to an example embodiment of the present disclosure. Method (200) can be implemented using any suitable computing system, including, for example, system 1100 of FIG. 11.

In addition, although FIG. 2 depicts steps performed in a particular order for purposes of illustration and discussion, the methods discussed herein are not limited to any particular order or arrangement. One skilled in the art, using the disclosures provided herein, will appreciate that various steps of method (200) can be omitted, rearranged, combined, and/or adapted in various ways without deviating from the scope of the present disclosure.

At (202) an image can be obtained. For example, the image can be an image depicting a portion of the surface of the Earth. The image can include a depiction of a bridge over a body of water.

At (204) a wide bridge mask and a narrow bridge mask can be determined based at least in part on a road mask and a water mask. For example, the wide bridge mask can be the intersection of a wide road mask and the water mask. The narrow bridge mask can be the intersection of a narrow road mask and an eroded version of the water mask. In some implementations, the road mask and the water mask can be pre-existing and obtained from memory. Furthermore, the road mask and the water mask can contain various inaccuracies.

At (206) a portion of the image obtained at (202) can be selected based at least in part on the wide bridge mask and the narrow bridge mask. For example, an intersection of the wide bridge mask and the narrow bridge mask can be determined at (206).

In some implementations, the portion of the image can be selected at (206) based at least in part on one or more narrow bridge mask components included in the intersection of the wide bridge mask and the narrow bridge mask. As an example, the portion of the image can be selected by identifying the longest connected component of the narrow bridge mask included within the image, rotating the image so that the longest connected component is horizontal, and cropping the image based on the longest connected component to form the selected portion. For example, the image can be cropped so that the longest connected component is at the center of the portion of the image, the portion of the image has a width generally equivalent to the length of the longest connected component, and the portion of the image has a height generally equivalent to two times a constant value.

At (208) a plurality of line features included in the portion of the image selected at (206) can be identified. The line detection algorithms employed at (208) can be robust against bridge shadows, water reflection, waves on water, and/or other changes in color or lighting.

As an example, identifying the line features at (208) can include first performing an edge detection algorithm on the original image to generate an edge image. For example, the edge detection algorithm can be the Canny edge detector used with a dynamically computed threshold (e.g. a signal-to-noise ratio). Next, a line detection algorithm can be applied to the edge image to identify the plurality of line features. For example, the line detection algorithm can be a modified Hough Transform algorithm that considers both gradient orientation and gradient magnitude.

At (210) a bridge boundary can be determined in the selected portion of the image based at least in part on the plurality of line features identified at (208). For example, one or more of the plurality of line features can be filtered (e.g. eliminated) at (208) if they do not satisfy certain criteria such as a required length, orientation, or gap pixel percentage. Outliers removal and/or voting techniques can also be employed at (210) to remove line feature outliers.

As another example, after the line features have been filtered, an oriented bounding box that encloses all remaining line features can be identified at (210) and can be used as the bridge boundary. In some implementations, the bounding box can be constrained to be oriented according to a dominant orientation of the line features or constrained to be oriented horizontal in nature.

Figure 3:
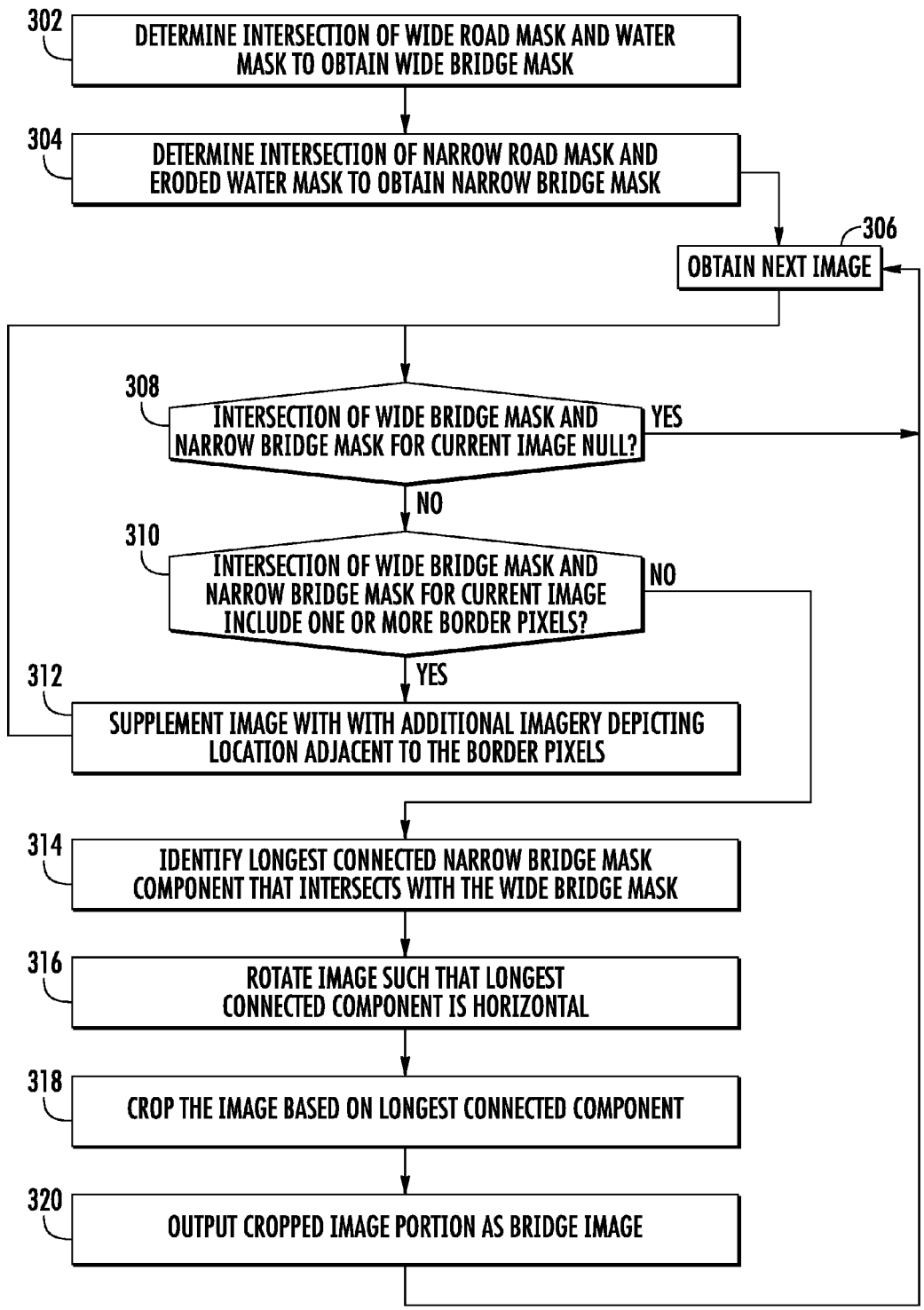
FIG. 3 depicts a flow chart of an example method for extracting bridge images according to an example embodiment of the present disclosure.

FIG. 3 depicts a flow chart of an example method (300) for extracting bridge images according to an example embodiment of the present disclosure. Method (300) can be implemented using any suitable computing system, including, for example, system 1100 of FIG. 11.

In addition, although FIG. 3 depicts steps performed in a particular order for purposes of illustration and discussion, the methods discussed herein are not limited to any particular order or arrangement. One skilled in the art, using the disclosures provided herein, will appreciate that various steps of method (300) can be omitted, rearranged, combined, and/or adapted in various ways without deviating from the scope of the present disclosure. At (302) the intersection of a wide road mask and a water mask can be determined such that a wide bridge mask is obtained. Likewise, at (304) the intersection of a narrow road mask and an eroded version of the water mask can be determined such that a narrow bridge mask is obtained.

Figure 4:
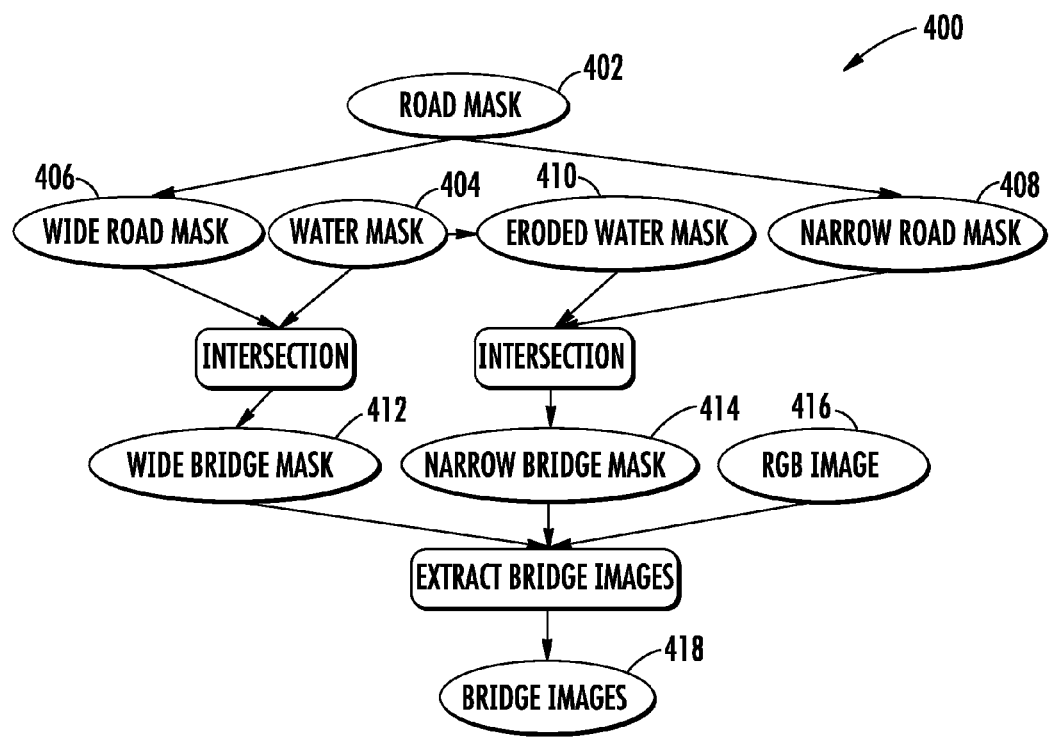
FIG. 4 depicts a graphical representation of an example workflow according to an example embodiment of the present disclosure.

As an example, FIG. 4 depicts a graphical representation 400 of an example workflow according to an example embodiment of the present disclosure. As shown in FIG. 4, a road mask 402 can be used to generate a wide road mask 406 and a narrow road mask 408. The road mask 402 can be pre-existing and can contain various inaccuracies.

The road mask 402 can be a vector of polylines that indicate the location of one or more roads in each of a plurality of images. In some instances, the road mask 402 describes the locations of respective road lanes rather than the road as a whole. The road mask 402 can be rasterized using a first road width value (e.g. eight meters) to obtain the wide road mask 406. Likewise, the road mask 402 can be rasterized using a second road width value (e.g. one meter) to obtain the narrow road mask 408.

The wide road mask 406 can be intersected with a water mask 404 to obtain a wide bridge mask 412. The water mask 404 can indicate whether a body of water exists at each of a plurality of locations respectively corresponding to a plurality of pixels included in imagery of the locations. For example, in some implementations, the water mask 404 can be a pixel mask that provides a binary water value for each pixel of a plurality of images.

The narrow road mask 408 can be intersected with an eroded version 410 of the water mask 404 to obtain a narrow bridge mask 414. The eroded version 410 of the water mask 404 can be obtained by eroding the water mask by an erosion distance (e.g. ten meters). Eroding the water mask by an erosion distance can include moving the boundary of each body of water inwards towards the center of such body of water by the erosion distance.

As will be discussed further below, the wide bridge mask 412 and narrow bridge mask 414 can be used to identify one or more bridges depicted by an image 416. One or more portions of the image 416 respectively depicting the one or more identified bridges can be selected and output as bridge images 418.

At (306) the next image can be obtained. More particularly, the systems and methods of the present disclosure can be applied to a plurality of images in an iterative fashion. For example, the plurality of images can be satellite imagery that aggregately depict an area such as a region or the entirety of the surface of the Earth.

As an example, the plurality of images can be orthographical satellite imagery that are organized into a plurality of image tiles. Each image tile can depict a particular subsection of the depicted region. Thus, each image tile can have adjacent image tiles that depict adjacent locations.

As such, at (306) the next image in the plurality of images can be obtained. For example, the plurality of images can be stored in a database and obtained by a processing device for individual analysis. It will be appreciated that the analysis of the plurality of images can be sequential or parallel in nature.

Figure 5:
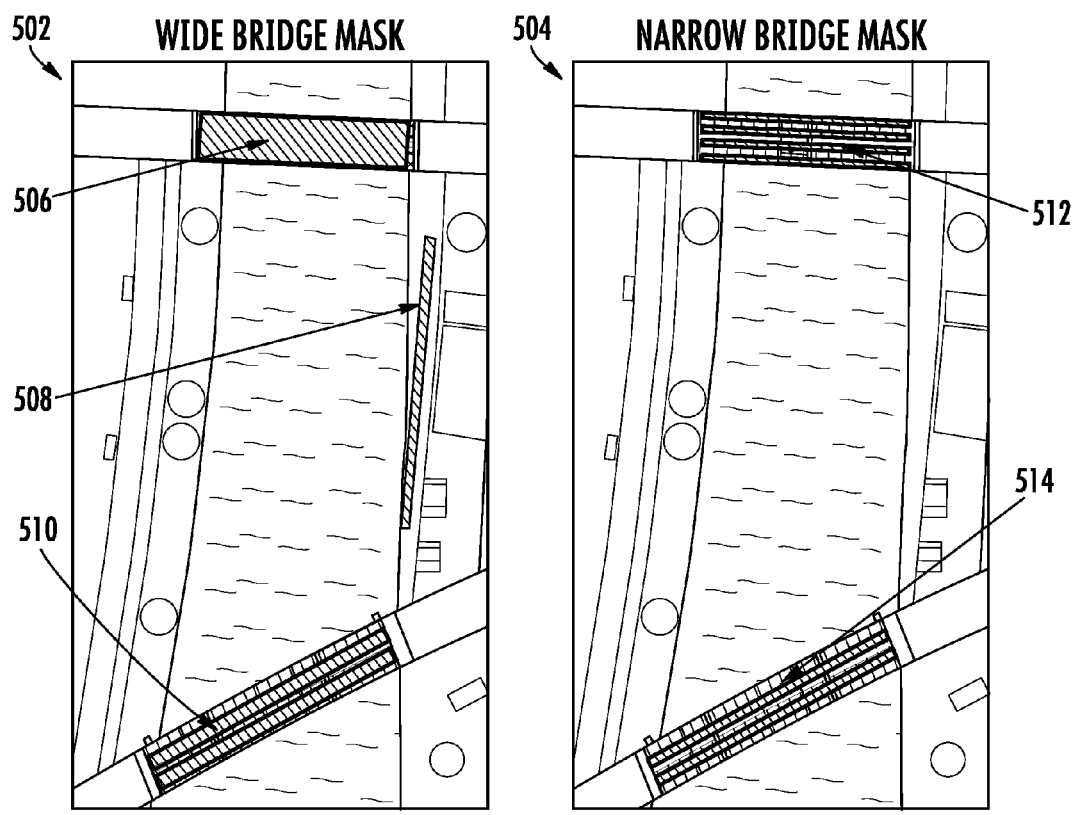
FIG. 5 depicts an example wide bridge mask and an example narrow bridge mask according to an example embodiment of the present disclosure.

At (308) it can be determined whether the intersection of the wide bridge mask and the narrow bridge mask for the image obtained at (306) is null. As an example, FIG. 5 depicts an example wide bridge mask 502 and an example narrow bridge mask 504 according to an example embodiment of the present disclosure. Wide bridge mask 502 includes wide bridge mask components 506, 508, and 510. Narrow bridge mask includes a first group 512 of narrow bridge mask components and a second group 514 of narrow bridge mask components.

Wide bridge mask component 508 demonstrates a common false positive associated with wide bridge masks. In particular, wide bridge mask component 508 corresponds to a road segment that runs adjacent to a body of water (e.g. along a river bank). Because the water mask and/or the road mask contains some inaccuracy, wide bridge mask component 508 represents a false positive for a bridge.

However, due to its heritage from the eroded version of the water mask, the narrow bridge mask 504 does not have a false positive component corresponding to the road segment indicated by wide bridge mask component 508. Thus, use of narrow bridge masks can assist in reducing false positive extractions associated with road segments along a waterfront.

Narrow bridge masks can also assist in increasing the accuracy of estimating bridge orientation. In particular, as narrow bridge mask components are generally shorter than the corresponding wide bridge mask components by two times the erosion distance, a relatively short bridge may be shortened to less than the road width used to rasterize the wide bridge mask. For example, a twenty five meter-long bridge can be eroded to five meters long, which is less than, for example, an eight meter wide road width value. As such, use of the less wide (one meter width) narrow bridge mask components can prevent the bridge orientation from being distorted in such scenario.

Use of the wide bridge mask 502 can assist in preventing redundant identification of a single bridge due to narrow bridge mask components corresponding to particular lanes of the single bridge. As an example, the first group 512 of narrow bridge mask components appears to correspond to four lanes of traffic across a single bridge. Use of only the narrow bridge mask component may lead to a false identification of group 512 as four different bridges, resulting in the creation of four different bridge images for subsequent boundary analysis. However, because wide bridge mask component 506 encloses each of the components of first group 512, the single bridge can be correctly identified and a single bridge image can be written out for boundary analysis, for example, based on the longest connected component of first group 512.

Referring again to (308) of FIG. 3, if it is determined at (308) that the intersection of the of the wide bridge mask and the narrow bridge mask for the image is null, then method (300) can return to (306) and obtain the next image. In other words, if the intersection is null, then the image can be determined to not depict any bridges and, therefore, method (300) can move on to the next image.

However, if it is determined at (308) that the intersection of the of the wide bridge mask and the narrow bridge mask for the current image is not null, then method (300) can proceed to (310). In other words, if the intersection is not null, then the image can be identified as depicting one or more bridges and can be subject to further analysis.

At (310) it can be determined whether the intersection of the wide bridge mask and the narrow bridge mask for the image includes one or more border pixels of the image obtained at (306). For example, the border pixels of the image can be the outermost pixels along the edges of the image. Thus, if the intersection includes one or more border pixels, then the image likely depicts only a portion of the bridge.

Therefore, if it is determined at (310) that the intersection of the wide bridge mask and the narrow bridge mask for the image includes one or more border pixels of the image, then method (300) can proceed to (312) and supplement the image with additional imagery depicting the location adjacent to the border pixels included in the intersection. For example, supplementing the image with additional imagery can include growing the image tile by adding or otherwise associating the adjacent tile. After (312), method (300) can return to (308) and begin analysis again.

However, referring again to (310), if it is determined that the intersection of the wide bridge mask and the narrow bridge mask does not include one or more border pixels of the image, then it can be assumed that the image depicts the bridge in its entirety. As such, method (300) can proceed to (314).

At (314) a longest connected narrow bridge mask component that intersects with the wide bridge mask component can be identified. For example, in some embodiments, each image can be treated as an undirected graph, where each image pixel covered by the water mask is a vertex of the graph and there is an edge between any two neighboring vertices (e.g. horizontally or vertically adjacent vertices). A connected component can be a subgraph, in which any two vertices are connected to each other by paths, and which is connected to no additional vertices in the rest of the graph. Thus, a longest of such connected components of the narrow bridge mask can be identified at (314).

Further, in some embodiments, at (314) a longest connected narrow bridge mask component can be identified for each distinct wide bridge mask component. Thereafter, each distinct wide bridge mask component and corresponding longest connected narrow bridge mask component can be treated individually as a distinct bridge.

Figure 6:
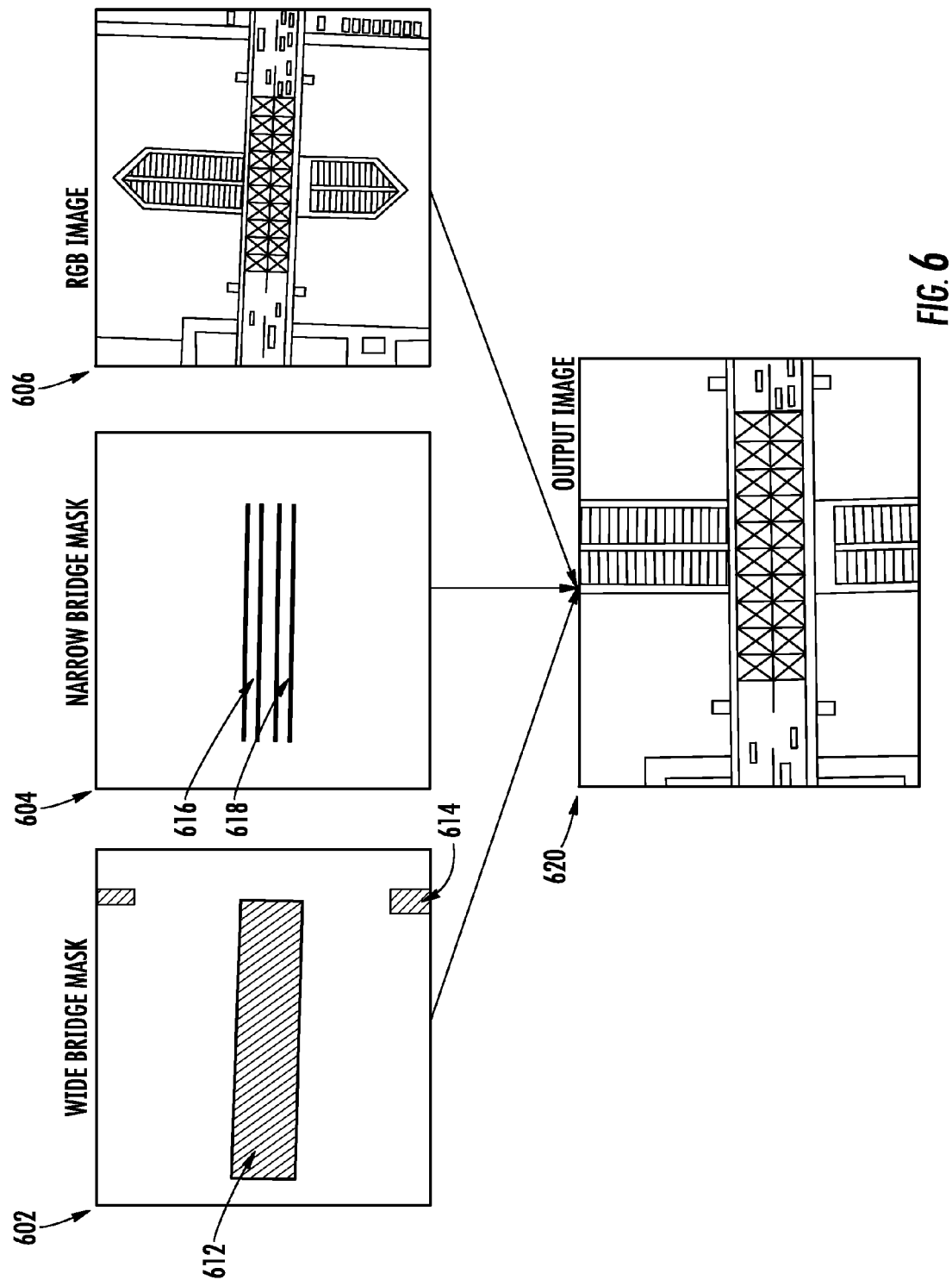
FIG. 6 depicts an example wide bridge mask, an example narrow bridge mask, an example input image, and an example output bridge image according to an example embodiment of the present disclosure.

As an example, FIG. 6 depicts an example wide bridge mask 602, an example narrow bridge mask 604, an example input image 606, and an example output bridge image 620 according to an example embodiment of the present disclosure.

Wide bridge mask 602 includes wide bridge mask components 612 and 614. Narrow bridge mask includes four narrow bridge mask components (e.g. components 616 and 618). Wide bridge mask component 614 does not intersect any narrow bridge mask components and, therefore, can be disregarded. However, a longest connected narrow bridge mask component can be identified for wide bridge mask component 612.

Figure 7:
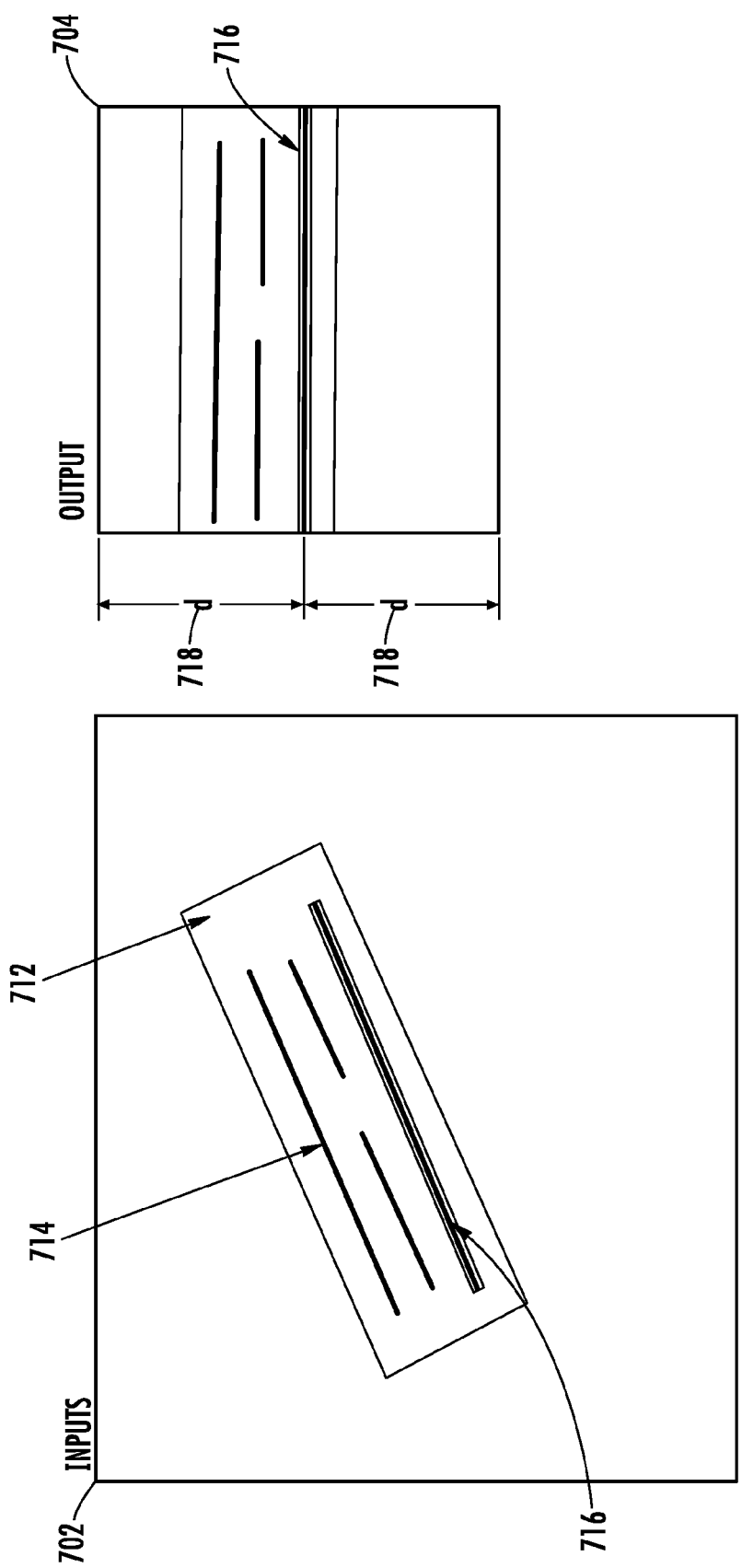
FIG. 7 depicts a graphical representation of an example input image and an example output bridge image according to an example embodiment of the present disclosure.

As an example, FIG. 7 depicts a graphical representation of an example input image 702 and an example output bridge image 704 according to an example embodiment of the present disclosure. Input image 702 has overlaid thereupon a representation of a wide bridge mask component 712 and a plurality of narrow bridge mask components including, for example, narrow bridge mask components 714 and 716.

According to an aspect of the present disclosure, narrow bridge mask component 716 can be identified as the longest connected narrow bridge mask component included in wide bridge mask component 712. Narrow bridge mask component 716 can be used to assist in selecting the portion of input image 702 to output as the bridge image 704, as will be discussed further with reference again to FIG. 3.

After the longest connected narrow bridge mask component that intersects with the wide bridge mask component has been identified at (314), then at (316) the image can be transformed (e.g. rotated) such that the identified longest connected component is horizontal in nature. Next, at (318) the image can be cropped based on the longest connected component.

As an example, referring again to FIG. 7, it can be seen that the output bridge image 704 has been transformed such that the longest connected narrow bridge mask component 716 is horizontal in nature and located at the center of the output bridge image 704. Furthermore, the input image 702 has been cropped such that the output bridge image 704 has a width that is generally equivalent to the length of the longest connected narrow bridge mask component 716 and a height generally equivalent to two times a constant distance 718.

However, other heights and widths can be used as well. For example, in some implementations, a buffer width (e.g.

equivalent to the erosion distance) can be added to each side of the longest connected narrow bridge mask component 716 to result in an output image that captures additional imagery of the bridge.

Referring again to FIG. 3, after the image has been cropped at (318), at (320) the cropped image portion can be output as a bridge image. As an example, referring to FIG. 6, the image 606 has been transformed and cropped according to the longest connected component of the narrow bridge mask 604 to select and output the bridge image 620.

In addition, in some embodiments, additional operations can be performed to ensure that duplicate image portions are not output. As an example, in the instance that the cropped portion corresponds to a plurality of different images (e.g. as a result of supplementing with additional imagery at (312), it can be determined whether the initial image includes a center of the depicted bridge. If the initial image includes the center of the bridge, then the final cropped image portion can be output as the bridge image. However, if the initial image does not include the center of the bridge, then the cropped image portion can be discarded, thereby preventing method (300) from outputting multiple image portions due to multiple initial images which depicted at least a portion of the bridge.

Other techniques for reducing duplicate outputs can be used as well. For example, in some embodiments, the analysis of whether the initial image includes the bridge center can be performed after (314) instead of after (320). If the initial image does not include the bridge center, then method (300) can return to (306).

Referring again to FIG. 3, after (320), method (300) can return to (306) and obtain the next image. In such fashion, each of a plurality of images can be analyzed to determine whether such image or expanded image after supplementing with adjacent images depicts a bridge. If an image is determined to depict a bridge, it can be transformed and cropped in order to isolate and select the portion of the image that depicts the bridge. Furthermore, if an image depicts a plurality of bridges, then a plurality of portions respectively depicting the plurality of bridges can be isolated and output.

Figure 8:
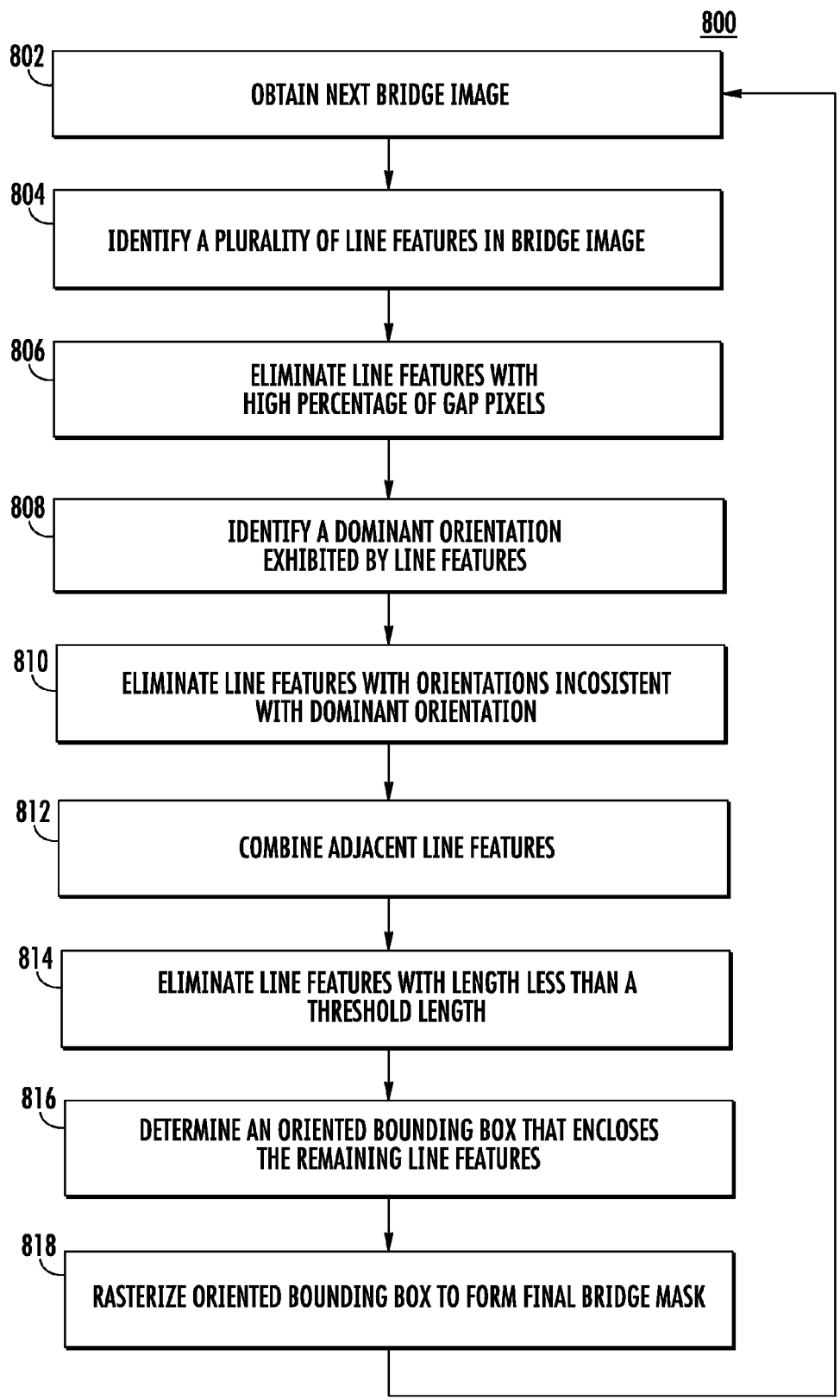
FIG. 8 depicts a flow chart of an example method for determining bridge boundaries in images according to an example embodiment of the present disclosure.

FIG. 8 depicts a flow chart of an example method (800) for determining bridge boundaries in images according to an example embodiment of the present disclosure. Method (800) can be implemented using any suitable computing system, including, for example, system 1100 of FIG. 11.

In addition, although FIG. 8 depicts steps performed in a particular order for purposes of illustration and discussion, the methods discussed herein are not limited to any particular order or arrangement. One skilled in the art, using the disclosures provided herein, will appreciate that various steps of method (800) can be omitted, rearranged, combined, and/or adapted in various ways without deviating from the scope of the present disclosure.

At (802) the next bridge image can be obtained. For example, method (300) of FIG. 3 can be applied to a plurality of images to identify images depicting bridges and output a bridge image for each image depicting a bridge. Therefore, a plurality of bridge images can be generated. Thus, at (802) the next of such plurality of bridge images can be obtained, for example, from memory.

At (804) a plurality of line features can be identified in the bridge image. The employed line detection algorithm can be robust against bridge shadows, water reflection, waves on water, and/or other changes in color or lighting.

As an example, identifying the line features at (804) can include first performing an edge detection algorithm on the original image to generate an edge image. For example, the edge detection algorithm can be the Canny edge detector used with a dynamically computed threshold for ending line features. For example, the dynamically computed threshold can be based on a signal-to-noise ratio. Next, a line detection algorithm can be applied to the edge image to identify the plurality of line features. For example, the line detection algorithm can be a modified Hough Transform algorithm that considers both gradient orientation and gradient magnitude.

However, other line detection algorithms can be used at (804) as well, including, for example, a Burns line detection algorithm and/or an implementation of the Canny detector plus Hough Transform available from the Open Source Computer Vision Library (OpenCV).

Figure 9A:
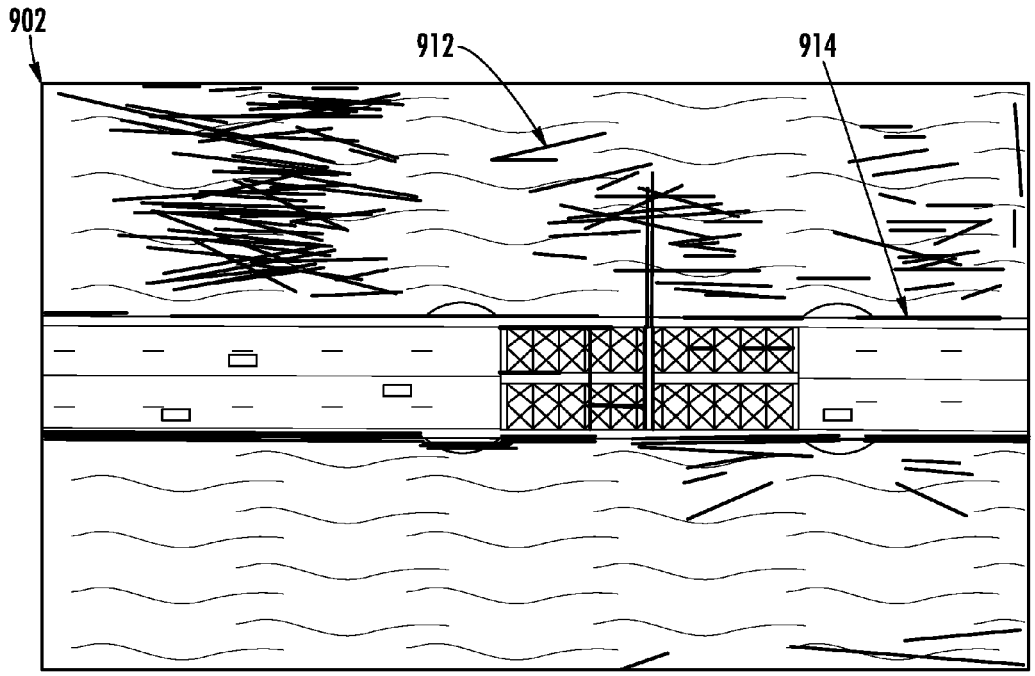
FIG. 9A depicts an example plurality of line features on an example bridge image according to an example embodiment of the present disclosure.

As an example, FIG. 9A depicts an example plurality of line features (e.g. line features 912 and 914) on an example bridge image 902 according to an example embodiment of the present disclosure. As can be seen from FIG. 9A, some of the plurality of line features correspond to depicted linear elements of a bridge while others of the plurality of line features correspond to depicted water elements that are linear in nature, such as waves upon the water surface.

Referring again to FIG. 8, at (806) line features with a high percentage of gap pixels can be eliminated. Thus, line features that correspond to inconsistent lines depicted in the image (e.g. due to waves on the water surface) can be eliminated.

At (808) a dominant orientation exhibited by the line features can be identified. For example, a voting technique can be performed to find the dominant line orientation. For example, a strength of a vote for each line feature can be proportional to the length of such line feature. In some implementations, the dominant line orientation can be biased towards being horizontal.

At (810) line features with orientations inconsistent with the dominant orientation can be eliminated. For example, if a difference between the dominant orientation and the orientation of a line feature exceeds a threshold difference, then such line feature can be eliminated. In such fashion, a large number of line features that do not correspond to the bridge (e.g. corresponding to other depicted structures or a shoreline) can be eliminated.

At (812) adjacent line features can be combined. For example, lines that are within a particular distance from one another can be connected.

At (814) line features having a length less than a threshold length can be eliminated. In such fashion, remaining line features that exhibit the dominant orientation but do not correspond to the bridge (e.g. short wave lines or boat wake lines) can be eliminated.

At (816) an oriented bounding box (OBB) that encloses the remaining line features can be determined. For example, the determined OBB can provide a minimum area while enclosing all remaining line features. Further, in some implementations, the bounding box can be constrained to exhibit the dominant orientation identified at (808) or can be constrained to be horizontal in nature. In addition, in some implementations, the bounding box is not required to be rectangular in nature, but instead can be other shapes including other polygons, non-rectilinear shapes, or contours.

In some embodiments, the oriented bounding box determined at (816) is not necessarily required to enclose each and every remaining line feature. For example, the bounding box can be determined according to a cost formula that balances the area covered by the bounding box versus a number or aggregate length of line features enclosed by the bounding box. In further implementations, the cost formula can account for a distance of each line feature from the horizontal center of the bridge image (e.g. line features at an extreme distance from the horizontal center may be less likely to influence the determined bounding box).

Figure 9B:
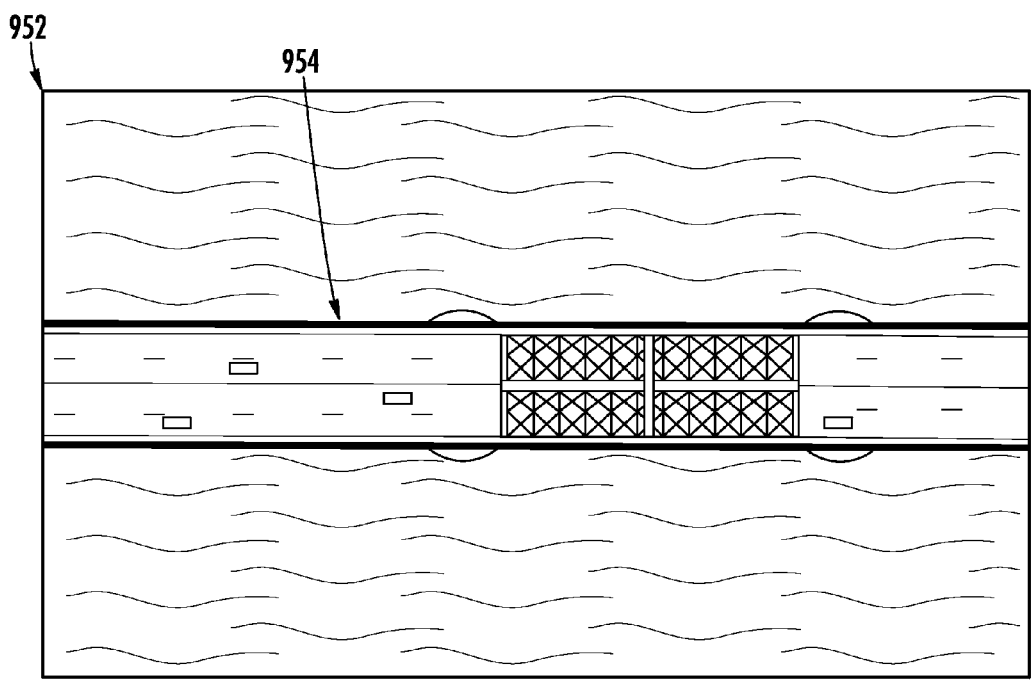
FIG. 9B depicts an example bridge boundary on an example bridge image according to an example embodiment of the present disclosure.

As an example, FIG. 9B depicts an example bridge boundary 954 on an example bridge image 952 according to an example embodiment of the present disclosure. More particularly, application of method (800) of FIG. 8 to the bridge image 902 of FIG. 9A has resulted in determination of the bridge boundary 954 as shown in FIG. 9B. The bridge boundary 954 can correspond to an oriented bounding box determined based on the plurality of line features determined for bridge image 902.

Referring again to FIG. 8, after the bounding box is determined at (816), at (818) the bounding box can be rasterized to form a final bridge mask. The final bridge mask can then be applied to the imagery to select which portions of the imagery will be used with a three-dimensional reconstruction algorithm to construct a three-dimensional model of the bridge. Alternatively, the three-dimensional reconstruction algorithm can be applied to all available imagery and then the portions of the resulting three-dimensional model that correspond to locations included within the water mask but not the final bridge mask can be discarded. In such fashion, the systems and methods of the present disclosure can provide an improved bridge mask and associated imagery for use in three-dimensional reconstructions.

Figure 10A:
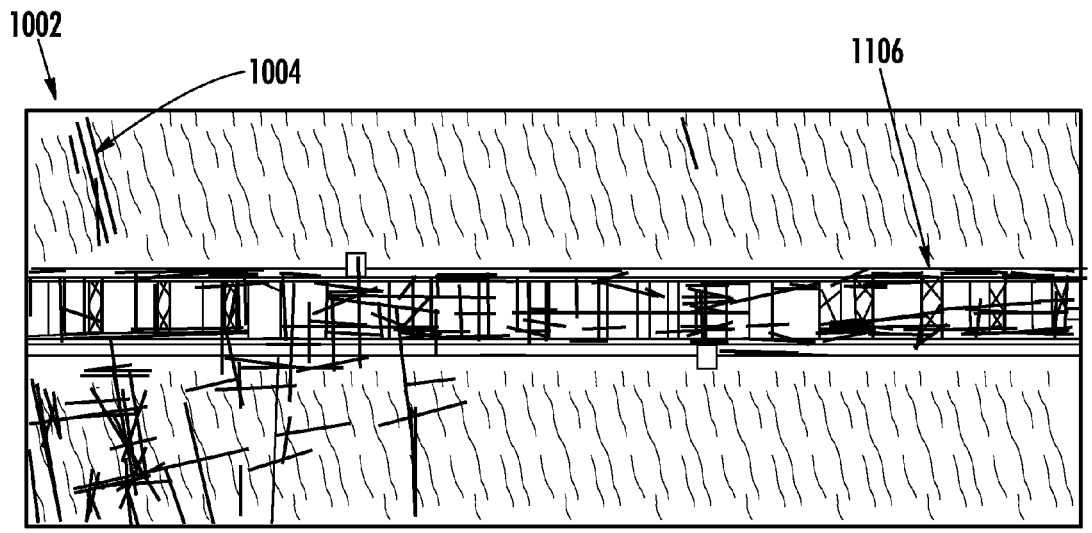
FIG. 10A depicts an example plurality of line features on an example bridge image according to an example embodiment of the present disclosure.
Figure 10B:
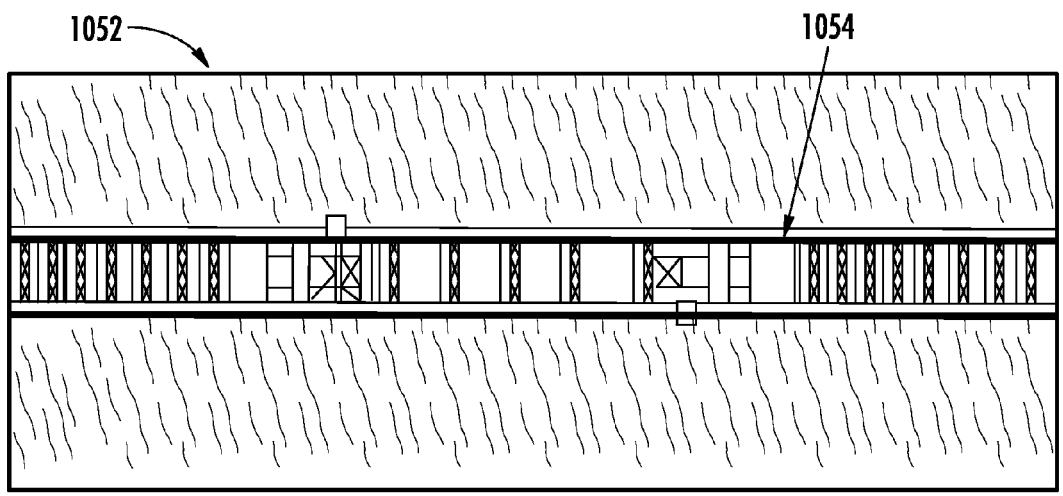
FIG. 10B depicts an example bridge boundary on an example bridge image according to an example embodiment of the present disclosure.

As another example, FIG. 10A depicts an example plurality of line features (e.g. line features 1004 and 1006) on an example bridge image 1002 according to an example embodiment of the present disclosure. FIG. 10B depicts an example bridge boundary 1054 on an example bridge image 1052 according to an example embodiment of the present disclosure. In particular, application of the above discussed principles to the plurality of line features determined for bridge image 1002 can result in determination of the bridge boundary 1054.

Example Systems

Figure 11:
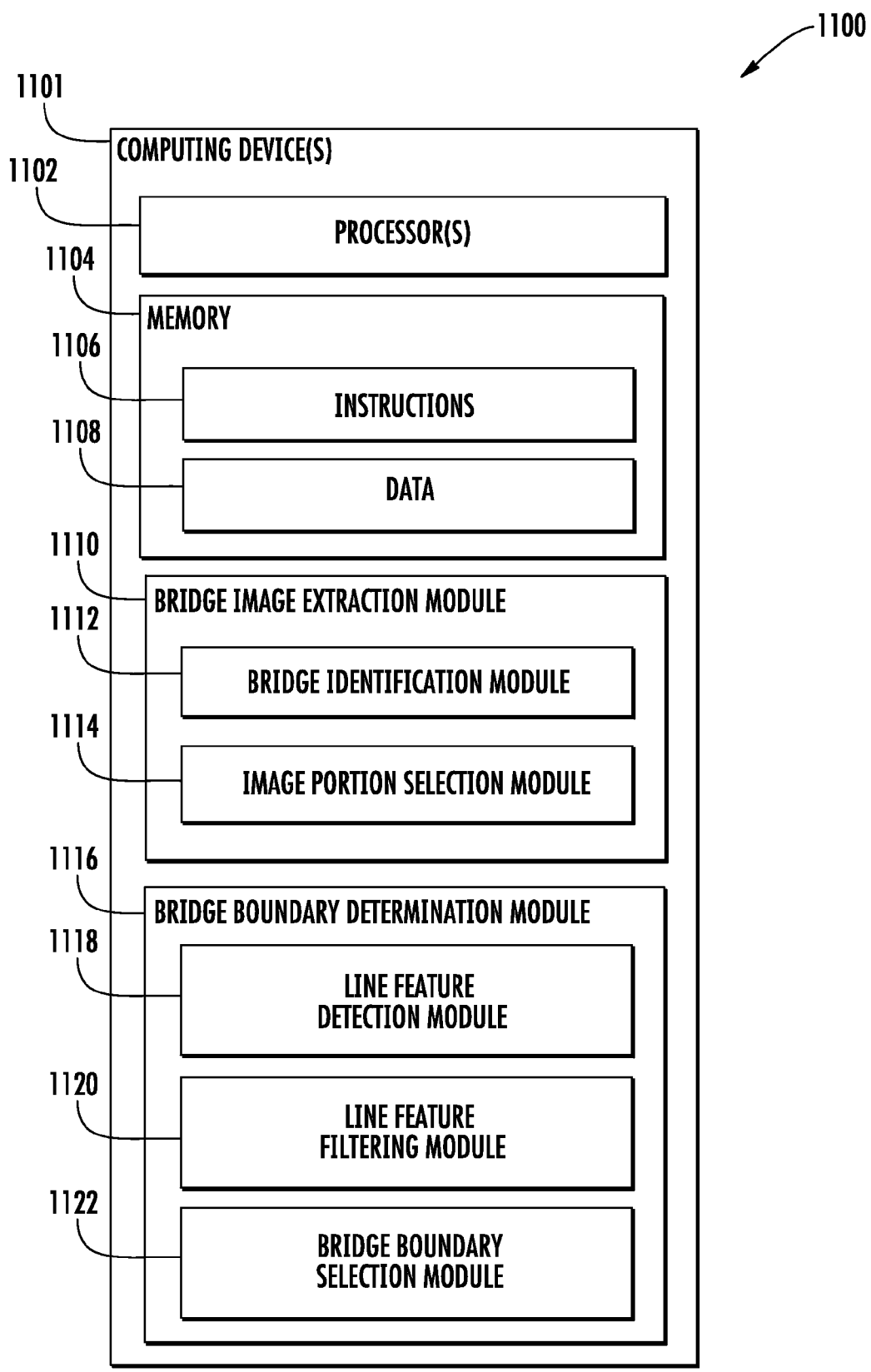
FIG. 11 depicts an example system for determining bridge boundaries in images according to an example embodiment of the present disclosure.

FIG. 11 depicts an example system 1100 for determining bridge boundaries in images according to an example embodiment of the present disclosure. System 1100 can include one or more computing devices 1101. In the instance that system 1100 includes a plurality of computing devices 1101, the plurality of computing devices 1101 can perform any computing or processing operations according to any suitable computer architectures, including parallel computing architectures, sequential computing architectures, or some combination thereof.

Computing devices 1101 can include one or more processors 1102 and a memory 1104. The processor(s) 1102 can be any suitable processing device, such as a microprocessor, microcontroller, integrated circuit, or other suitable processing device. The memory 1104 can include any suitable computing system or media, including, but not limited to, non-transitory computer-readable media, RAM, ROM, hard drives, flash drives, or other memory devices, or combinations thereof. The memory 1104 can store information accessible by processor(s) 1102, including instructions 1106 that can be executed by processor(s) 1102. The instructions 1106 can be any set of instructions that when executed by the processor(s) 1102, cause the processor(s) 1102 to provide desired functionality. Memory 1104 can also store various forms of data 1108.

According to an aspect of the present disclosure, the one or more computing devices 1101 can include a bridge image extraction module 1110 and a bridge boundary determination module 1116.

The computing devices 1101 can implement bridge image extraction module 1110 to identify, isolate, and extract a portion of each of a plurality of images depicting bridges. As an example, in some embodiments, bridge image extraction module 1110 can be implemented to perform aspects of method (300) of FIG. 3.

The computing devices 1101 can implement bridge boundary determination module to determine a bridge boundary for each of a plurality of bridge images. As an example, in some embodiments, bridge boundary determination module 1116 can be implemented to perform aspects of method (800) of FIG. 8.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Bridge image extraction module 1110 can include a bridge identification module 1112 and an image portion selection module 1114. Bridge identification module 1112 can be implemented to identify one or more bridges depicted by an image. For example, bridge identification module 1112 can be implemented to generate a wide bridge mask and a narrow bridge mask using a road mask and a water mask and then determine the intersection of the wide bridge mask and the narrow bridge mask.

Image portion selection module 1114 can be implemented to isolate and extract one or more portions of an image the particularly depict a bridge. For example, image portion selection module 1114 can be implemented to identify a longest connected narrow bridge mask component and then rotate, crop, and output a selected portion of an image based on the identified component.

Bridge boundary determination module 1116 can include a line feature determination module 1118, a line feature filtering module 1120, and a bridge boundary selection module 1122. Line feature determination module 1118 can be implemented to perform one or more line detection techniques to identify a plurality of line features exhibited by an image.

Line feature filtering module 1120 can be implemented to filter (e.g. eliminate) one or more line features based on various criteria. For example, line feature filtering module 1120 can be implemented to filter the line features based on length, orientation, gap pixel percentage, or other criteria.

Bridge boundary selection module 1122 can be implemented to determine a bridge boundary based on a plurality of line features. For example, bridge boundary selection module 1122 can be implemented to determine a minimized oriented bounding box that encloses one or more dominant line features. As another example, bridge boundary selection module 1122 can be implemented to determine an oriented bounding box by minimizing a cost formula that balances the area covered by the bounding box versus a number or aggregate length of line features enclosed by the bounding box.

The technology discussed herein makes reference to computing devices, databases, software applications, and other computer-based systems, as well as actions taken by and information sent to and from such systems. One of ordinary skill in the art will recognize that the inherent flexibility of computer-based systems allows for a great variety of possible configurations, combinations, and divisions of tasks and functionality between and among components. For instance, computing processes discussed herein may be implemented using a single computing device or multiple computing devices working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining bridge boundaries in images, the method comprising:
   determining, by one or more computing devices, a wide bridge mask and a narrow bridge mask based at least in part on a road mask and a water mask, wherein each of the one or more computing devices comprises one or more processors, and wherein determining, by the one or more computing devices, the wide bridge mask and the narrow bridge mask based at least in part on the road mask and the water mask comprises:
      determining, by one or more computing devices, a first intersection of a wide road mask and the water mask to obtain the wide bridge mask; and
      determining, by the one or more computing devices, a second intersection of a narrow road mask and an eroded version of the water mask to obtain the narrow bridge mask;
   selecting, by the one or more computing devices, a portion of an image depicting a bridge based at least in part on the wide bridge mask and the narrow bridge mask;
   identifying, by the one or more computing devices, a plurality of line features included in the portion of the image depicting the bridge; and
   determining, by the one or more computing devices, a bridge boundary in the portion of the image based at least in part on the plurality of line features;
   wherein the water mask indicates whether a body of water exists at each of plurality of locations respectively corresponding to a plurality of pixels included in the image depicting the bridge;
   wherein the eroded version of the water mask comprises the water mask eroded by an erosion distance;
   wherein the road mask comprises a vector of polylines indicating the location of one or more roads in the image;
   wherein the wide road mask comprises the road mask rasterized at a first width value;
   wherein the narrow road mask comprises the road mask rasterized at a second width value; and
   wherein the second value is less than the first value.

2. The method of claim 1, wherein identifying, by the one or more computing devices, the plurality of line features included in the portion of the image depicting the bridge comprises performing, by the one or more computing devices, an edge detection algorithm that uses a dynamically computed threshold for ending edge features, wherein the dynamically computed threshold is based on a signal-to-noise ratio.

3. The method of claim 2, wherein identifying, by the one or more computing devices, the plurality of line features included in the portion of the image depicting the bridge further comprises performing, by the one or more computing devices, a Hough Transform algorithm that considers both gradient orientations and gradient magnitudes associated with an edge image generated by the edge detection algorithm.

4. The method of claim 1, wherein determining, by the one or more computing devices, the bridge boundary in the portion of the image based at least in part on the plurality of line features comprises determining, by the one or more computing devices, an oriented bounding box that encloses the plurality of line features, wherein the oriented bounding box comprises the bridge boundary.

5. The method of claim 4, further comprising, prior to determining the oriented bounding box, filtering, by the one or more computing devices, the plurality of line features.

6. The method of claim 5, wherein filtering, by the one or more computing devices, the plurality of line features comprises:
   identifying, by the one or more computing devices, a dominant orientation exhibited by the plurality of line features; and
   eliminating, by the one or more computing devices, any of the plurality of line features that exhibit an orientation inconsistent with the dominant orientation.

7. The method of claim 6, wherein the oriented bounding box is constrained to exhibit the dominant orientation.

8. The method of claim 5, wherein filtering, by the one or more computing devices, the plurality of line features comprises:
   connecting, by the one or more computing devices, one or more of the plurality of line features that are adjacent to each other; and
   eliminating, by the one or more computing devices, any of the plurality of line features that, after the connecting, have a length less than a threshold length.

9. The method of claim 4, further comprising rasterizing, by the one or more computing devices, the oriented bounding box to generate a final bridge mask.

10. A system comprising:
    one or more computing devices, wherein each of the one or more computing devices comprises one or more processors; and
    one or more non-transitory computer-readable media storing instructions that, when executed by the one or more computing devices, cause the one or more computing devices to perform operations, the operations comprising:
       determining a wide bridge mask based at least in part on a wide road mask and a water mask;
       determining a narrow bridge mask based at least in part on a narrow road mask and an eroded version of the water mask;
       selecting a portion of an image depicting a bridge based at least in part on the wide bridge mask and the narrow bridge mask, wherein the selected portion contains one or more narrow bridge mask components that intersect with the wide bridge mask;
       identifying a plurality of line features included in the selected portion of the image;
       filtering the plurality of line features to identify one or more dominant line features, wherein filtering the plurality of line features to identify the one or more dominant line features comprises:
  identifying a dominant orientation exhibited by the plurality of line features; and
  eliminating any of the plurality of line features that exhibit an orientation inconsistent with the dominant orientation, such that the one or more dominant line features remain; and
determining a bridge boundary in the portion of the image based at least in part on the one or more dominant line features, wherein determining the bridge boundary in the portion of the image based at least in part on the one or more dominant line features comprises identifying an oriented bounding box that encloses the one or more dominant line features, wherein the bounding box comprises the bridge boundary.

11. A method for determining bridge boundaries in images, the method comprising:
  determining, by one or more computing devices, a wide bridge mask and a narrow bridge mask based at least in part on a road mask and a water mask, wherein each of the one or more computing devices comprises one or more processors;
  selecting, by the one or more computing devices, a portion of an image depicting a bridge based at least in part on the wide bridge mask and the narrow bridge mask, wherein selecting, by the one or more computing devices, the portion of the image depicting the bridge based at least in part on the wide bridge mask and the narrow bridge mask comprises:
    determining, by the one or more computing devices, an intersection of the wide bridge mask and the narrow bridge mask;
    identifying, by the one or more computing devices, one or more narrow bridge mask components included in the intersection of the wide bridge mask and the narrow bridge mask; and
    selecting, by the one or more computing devices, the portion of the image depicting the bridge based at least in part on the one or more narrow bridge mask components included in the intersection of the wide bridge mask and the narrow bridge mask, wherein selecting, by the one or more computing devices, the portion of the image depicting the bridge based at least in part on the one or more narrow bridge mask components included in the intersection of the wide bridge mask and the narrow bridge mask comprises:
      identifying, by the one or more computing devices, a longest connected component of the one or more narrow bridge mask components included in the intersection of the wide bridge mask and the narrow bridge mask; and
      cropping, by the one or more computing devices, the image based on the longest connected component of the one or more narrow bridge mask components to form the portion of the image;
  identifying, by the one or more computing devices, a plurality of line features included in the portion of the image depicting the bridge; and
  determining, by the one or more computing devices, a bridge boundary in the portion of the image based at least in part on the plurality of line features.

12. The method of claim 11, wherein cropping, by the one or more computing devices, the image based on the longest connected component of the one or more narrow bridge mask components to form the portion of the image comprises:
  rotating, by the one or more computing devices, the image such that the longest connected component is horizontal; and
  cropping, by the one or more computing devices, the image such that the longest connected component is at the center of the portion of the image, wherein the portion of the image has a width generally equivalent to the length of the longest connected component and a height generally equivalent to two times a constant value.

13. The method of claim 11, wherein identifying, by the one or more computing devices, the plurality of line features included in the portion of the image depicting the bridge comprises performing, by the one or more computing devices, an edge detection algorithm that uses a dynamically computed threshold for ending edge features, wherein the dynamically computed threshold is based on a signal-to-noise ratio.

14. The method of claim 13, wherein identifying, by the one or more computing devices, the plurality of line features included in the portion of the image depicting the bridge further comprises performing, by the one or more computing devices, a Hough Transform algorithm that considers both gradient orientations and gradient magnitudes associated with an edge image generated by the edge detection algorithm.

15. The method of claim 11, wherein determining, by the one or more computing devices, the bridge boundary in the portion of the image based at least in part on the plurality of line features comprises determining, by the one or more computing devices, an oriented bounding box that encloses the plurality of line features, wherein the oriented bounding box comprises the bridge boundary.

16. The method of claim 15, further comprising, prior to determining the oriented bounding box, filtering, by the one or more computing devices, the plurality of line features.

17. The method of claim 16, wherein filtering, by the one or more computing devices, the plurality of line features comprises:
  identifying, by the one or more computing devices, a dominant orientation exhibited by the plurality of line features; and
  eliminating, by the one or more computing devices, any of the plurality of line features that exhibit an orientation inconsistent with the dominant orientation.

18. The method of claim 17, wherein the oriented bounding box is constrained to exhibit the dominant orientation.

19. The method of claim 16, wherein filtering, by the one or more computing devices, the plurality of line features comprises:
  connecting, by the one or more computing devices, one or more of the plurality of line features that are adjacent to each other; and
  eliminating, by the one or more computing devices, any of the plurality of line features that, after the connecting, have a length less than a threshold length.

20. The method of claim 15, further comprising rasterizing, by the one or more computing devices, the oriented bounding box to generate a final bridge mask.

* * * * *